Patented Nov. 18, 1952

2,618,618

UNITED STATES PATENT OFFICE 2,618,618

CASHEW NUT SHELL LIQUOR-VINSOL COMPOSITIONS

Peter L. Rosamilia, Newark, N. J., and Solomon Caplan, New York, N. Y., assignors to The Harvel Corporation, a corporation of New Jersey No Drawing. Application February 21, 1952, Serial No. 272,898

22 Claims. (Cl. 260—24)

The invention relates to novel compositions of matter and to methods for preparing them. It is directed to novel products prepared from liquid anacardic materials and solid pine wood pitches or resins commonly termed "Vinsol," and with or without the use of "reagents," which may be aldehydes or those containing a reactive methylene group. The following are examples given merely by way of illustration of said "reagents"; aldehydes such as formaldehyde, furfuraldehyde, crotonaldehyde, acetaldehyde, glyoxal, acrolein, the polymers thereof such as paraformaldehyde, trioxane, polymerized glyoxal and polymerized acrolein and also other compounds containing a reactive methylene group such as hexamethylene tetramine.

The pine wood resins or pitches, commonly termed "Vinsol" are obtained from pine, are relatively cheap and are available on the market in large quantities. In general they are at least 75% insoluble in gasoline, at least 90% insoluble in petroleum ether, at least 50% soluble in boiling toluene and have a methoxy content of at least 3%. They are fairly high melting point resins whose melting points are in the approximate range of 200–260° F., whose acid numbers are in the approximate range of 85–110 and whose saponification numbers are in the approximate range of 120–150. The methoxy content is usually in the approximate range of 3–7%. The gasoline insolubility may be anywhere from 75% to maximum and the petroleum ether insolubility may be anywhere from 90% to maximum. A typical specimen of said Vinsol had the following characteristics: 86% insoluble in gasoline, 98% insoluble in petroleum ether, melting point 115° C., acid number 95, methoxy content 5–6%, saponification number 125–135, and more than 50% soluble in boiling toluene.

The liquid anacardic materials employed are cashew nut shell liquid and its liquid polymers, distillates of cashew nut shell liquid and their liquid polymers, which distillates have a boiling point of approximately 225° C. at 10 mm. of mercury pressure and residues of cashew nut shell liquid and their liquid polymers, which residues measure between 25–75% of the cashew nut shell liquid from which they were derived.

The cashew nut shell liquid may be the raw cashew nut shell liquid obtained by the solvent extraction of said liquid from the cashew nuts or by the extraction of said liquid from said nuts by the use of a hot cashew nut shell liquid bath as set forth in the U. S. patent to E. R. Hughes No. 2,058,456, of October 27, 1936, or it may be the so-called treated cashew nut shell liquid obtained after the raw cashew nut shell liquid has been treated to reduce its vesicant action and to remove the naturally occurring metals therein as set forth in the patents to Harvey et al., No. 2,067,919 of January 19, 1937 and 2,128,247 of August 30, 1938; Patent 2,559,593 of Solomon Caplan issued on July 10, 1951, to which reference is hereby made, or it may be either the raw or treated cashew nut shell liquid which has been steam distilled or distilled under vacuum at about 500–600° F. to remove the more volatile constituents which measure up to 10% by weight of the liquid treated. It is preferred that the cashew nut shell liquid be of the substantially completely decarboxylated type and from which there has been removed the nitrogenous and metal components naturally occurring therein.

The distillates and residues from cashew nut shell liquid may be obtained by distilling cashew nut shell liquid. The preferable manner of obtaining these products is to distill the cashew nut shell liquid at elevated temperatures. In commercial production, the cashew nut shell liquid may be either gas or vapor and, for example, steam distilled preferably at between 600–700° F. or distilled under sub-atmospheric pressure conditions and preferably below about 50 mm. of mercury pressure and temperatures between about 400–700° F. When distilled under reduced pressure of about 50 mm. of mercury, we prefer to employ temperatures between about 525–700° F. and when distilled under reduced pressure of about 10 mm. of mercury, we prefer to employ a temperature of about 450° F. By whatever method employed, the distillation is continued until the quantity by weight of the distillate is between about 25% to about 75% of the quantity by weight of the cashew nut shell liquid. The distillates thus obtained for the most part consist of a phenol having an unsaturated hydrocarbon substituent of 15 carbon atoms and having a boiling point of approximately 225° C. at 10 mm. of mercury pressure. Of these distillates, we prefer to employ those produced by vacuum distillation, thus eliminating the use of steam or the like.

The liquid polymers of cashew nut shell liquid and said residues are generally produced by heating them usually in the presence of an acidic or alkaline catalyst, such as a mineral acid as, for example, hydrochloric, sulphuric acid, etc., or alkyl sulphate, diethyl sulphate, etc., or lime, sodium hydroxide, potassium hydroxide, etc.

The liquid polymers of the distillates of cashew nut shell liquid may be produced by heating with a mineral acid or alkyl sulphate, such as hydrofluoric, hydrochloric or sulphuric acid, etc., and diethyl sulphate.

The various liquid anacardic materials, however obtained, vary in consistency or viscosity from a thin, readily pourable liquid to a so-called "plastic solid" exhibiting cold flow, and being readily pourable at 300° F.

It is known that all of the aforesaid liquid anacardic materials may be converted to the solid state, that is, the state in which they exhibit no cold flow, by heating them in the presence of a catalyst such as sulphuric acid, diethyl sulphate, etc., except that when the distillates or liquid polymers thereof are used, hydrofluoric acid is the catalyst employed for converting them to the solid state. None of these solids can be converted back to the liquid state by heating them to any temperature up to 300° F.

According to this invention, the following are some examples of the novel compositions which may be provided:

A. Vinsol in combination with one or more of said liquid anacardic materials. A method which may be employed for the production of said products, is to heat a mixture of said Vinsol together with the liquid anacardic material in any desired proportion depending upon the properties required in the end product. For most purposes the ratio by weight of Vinsol to liquid anacardic material in said mixture is in the range of 1-10 to 10-1 and the temperature employed is in the range of 200-600° F. and in factory practice 225-400° F., whereby with or without the aid of an acidic or alkaline catalyst, a reaction takes place to provide a thickened homogeneous product. The time of maintaining said mix in said temperature range is at least 30 minutes and generally between one-half to 6 hours depending on the particular temperature employed, the size of the batch and the desired end product.

A specific type of Vinsol-liquid anacardic material product that has been found particularly useful is that produced by heating a mixture of one part by weight of Vinsol together with 0.1-1 part by weight of the liquid anacardic material in a temperature range of 200-600° F. and in factory practice 250-350° F. for a sufficient length of time to note an appreciable thickening of the mass at that temperature and so that a sample thereof when cooled to room temperature is a brittle button. For that purpose and particularly when cashew nut shell liquid, said residues or the liquid polymers thereof are employed as the liquid anacardic material, maintaining the mass within that temperature range for a period of about 1 to 2 hours is sufficient. However, when said distillates or the liquid polymers thereof are employed as the liquid anacardic material, an exceedingly greater period of heating in said temperature range is generally required. After the mass has become thickened at that temperature, it may be poured into shallow pans and cooled to room temperature at which temperature the mass is a solid which may be readily comminuted in factory practice to provide fine particles in the nature of a powder or dust, which particles are relatively hard when compared with the corresponding liquid anacardic material which has been polymerized to the solid state by heat alone and in the absence of the Vinsol and then comminuted, which particles are brittle but are not friable when compared with Vinsol, which particles will not mass to any objectionable degree on storage and which particles are fusible resins which on heating may be converted from the solid to the liquid state before a temperature of 300° F. is attained. This last characteristic is of particular significance because the solid polymers of said anacardic materials cannot be converted to the liquid state at a temperature even as high as 400° F.

B. The aforesaid Vinsol-liquid anacardic material combinations of A. may, either with or without the aid of an acidic or alkaline catalyst, be reacted with one or more of said "reagents" to provide resinous reaction products which in their final state are solid and substantially infusible. In commercial practice the ratio by weight of said Vinsol-liquid anacardic material to said "reagent" is usually in the range of 100-1 to 10-1 and the temperature employed is usually in the range of 250-350° F. In one of its more specific aspects, said fine powder or dust may be physically combined with one of said "reagents" in the solid state, such as paraform or hexamethylene tetramine. Then this combination containing the required amount of said "reagent" may be heated to provide a solid resinous product which in its end state is thermoset.

C. The Vinsol-liquid anacardic material combinations of A. may be halogenated or sulphurized. An example of halogenation is to heat the mass in order to liquify it and add chlorine thereto in successive small increments until the desired degree of chlorination is attained, which may be between 1-20% or higher, by weight. The sulphurization may be carried out by rendering alkaline the mass of Vinsol-liquid anacardic material by the addition of an aqueous solution of sodium hydroxide and adding thereto while the mass is in the liquid form, the desired quantity of sulphur, which may be in the form of free sulphur, sulphur chloride or an alkaline polysulphide. The mass is maintained at liquification temperature of the mass or somewhat higher, up to say 300-350° F. for about 1 to 2 hours and is then poured into pans and cooled to provide a sulphurized product having a sulphur content of 1-20% or more by weight. The various halogenated or sulphurized products may also be reacted with one or more of said "reagents" and generally in the proportion by weight of 100-10 parts of the former to 1 part of the latter, and usually in the temperature range of 250-350° F.

D. Vinsol may first be reacted with one or more of said reagents to provide resinous organic reaction products which at temperatures of 300° F. are liquids, and then these products may be combined with a combination of two or more of said liquid anacardic materials in any desired proportion and in general, 10 parts of the former to 1-100 parts of the latter. For example, 1-10 parts of the Vinsol-"reagent" organic reaction products are added to 10-1 parts of the liquid anacardic material and the mixture is then heated to a temperature of approximately 250-350° F. and then poured into pans and cooled to room temperature and is found to be a solid which is liquid at a temperature of 300° F. and generally is initially fusible considerably below 300° F. For one of the purposes of this invention, Vinsol is reacted with one of said "reagents" in the mole proportion of about 1 of the former to approximately one-quarter to one-third mole of the latter by heating a mixture thereof in the range of about 205-250° F. for approximately ½ hour. The mass is then dehydrated under vacuum and to 1 part of such resin there is added a quantity of anacardic material which measures .1 to 1 part and this mixture is maintained at 250-350° F. until a sample thereof when cooled to room temperature is a brittle button. Then the hot mass is dumped into shallow pans and allowed to cool, and at room temperature it will be solid and also be readily comminutable and will be liquid at 300° F. and generally below that temperature. It is to be understood that the Vinsol may be reacted with any of said "reagents" and in some cases the amount of "reagent" permissible may be less than in others depending upon the particular reagent used to provide either a thermoplastic or thermosetting reaction product in its intermediate or fusible state. The Vinsol-reagent reaction product, in either case, employed in the practice of this invention is in the liquid state at 300° F.

The following examples are given merely by way of illustrating various products of this invention, with all parts being given by weight unless otherwise specified.

EXAMPLE I 100 parts of Vinsol and 65 parts of residue (prepared by vacuum distillation of treated cashew nut shell liquid until 50% of distillate has been removed) were heated together for a period of about 1½ hours at 300° F. Then the mass which had thickened was poured into shallow pans and cooled overnight to room temperature. The resultant product was solid and known as Product I, was pulverized and was a fusible resin having a melting point no greater than 170° F.

EXAMPLE II 100 parts of Vinsol and 65 parts of treated cashew nut shell liquid were heated together for 2½ hours at 300° F. Then the mass which had thickened was poured into shallow pans and cooled overnight to room temperature. The resultant product was solid and known as Product II, was pulverized and was a fusible resin whose melting point was no greater than 170° F.

Products I and II may be reacted with any of said "reagents" to provide either thermoplastic or thermosetting resins depending upon the proportion of said "reagent" employed in the reaction. These reaction products may be employed in brake linings, clutch facings, etc. and other friction elements, in molding powders, grinding wheels, etc. Products I and II may also be dissolved in an organic solvent such as alcohol and employed as a shellac substitute.

A method which may be employed for the production of a friction element such as a brake lining is to place 90-110 parts of asbestos fibers to 10-30 parts of pulverized Product I or II and 1-5 parts of hexamethylene tetramine into a dough-mixer. The dry mass is agitated and mixed to uniformity. Then it is molded under heat of 250-350° F. and a pressure of 1000-3000 lbs. per square inch to product sheets of required thickness which are later shaped and cut to required size.

If desired, said Products I and II may be reacted with one or more of said "reagents" to provide dry, hard and infusible reaction products which may then be comminuted and these particles may be employed as discrete particles as friction augmenting components in brake linings.

EXAMPLE III 1-5 parts of hexamethylene tetramine or paraformaldehyde were mixed with 100 parts of Product I, Product II or a combination of Products I and II and this dry, powdered mass was then heated to 300° F. for 1 hour to provide an infusible resinous reaction product, known as Product III and may be pulverized.

The Vinsol may be reacted with any of said reagents and in some cases the amount of reagent permissible may be less than in others depending upon the particular reagent used to provide either a thermoplastic or a thermosetting Vinsol-"reagent" reaction product in its intermediate or fusible state. That is, in either case, the Vinsol-"reagent" reaction product is fusible and preferably in the liquid state at a temperature of 300° F.

*Preparation of Vinsol-furfuraldehyde*

A mixture comprising 100 parts of Vinsol and 5-25 parts of furfuraldehyde, with or without an acidic or alkaline catalyst, is heated at a temperature of approximately 300° F. for 30-60 minutes. The resultant resinous reaction product is thermoplastic and hereafter is known as Product VF. When the quantity of furfuraldehyde measures as high as 25% to the quantity of Vinsol in said mixture, there is an excess of furfuraldeyhde; however, an excess of furfuraldehyde need not be employed.

*Preparation of anacardic material-(Vinsol-furfuraldehyde) resinous reaction product*

100 parts of Product VF and 25-85 parts of one or a combination of two or more of said liquid anacardic materials are mixed together. This mixture with or without the aid of an acidic or alkaline catalyst is heated to a temperature between 200-600° F. and in factory practice 225-400° F., to provide a thickened homogeneous product. It is desirable that the mixture be constantly agitated while being heated. The heating is continued for a sufficient length of time so that when the resultant mass is poured into shallow pans and allowed to cool overnight to room temperature, it will be a solid resinous composition which may be converted to the liquid state at a temperature no greater than 300° F. The time of maintaining said mix in said temperature range is generally between one-half to six hours, depending upon the particular temperatures employed, the size of the batch and the desired end product. The time of heating the mixture is generally determined by withdrawing samples at regular intervals and the heating, for most purposes, is generally terminated when a sample thereof upon being cooled to room temperature is a brittle button and has a melting point below 300° F. These novel products are hereinafter termed Product VFAn.

In factory practice, after the heating has been terminated, the mass is poured into shallow pans and cooled to room temperature at which temperature the mass is a solid which may be readily comminuted in factory practice to provide fine particles in the nature of a powder or dust. These particles are relatively hard when compared with the corresponding liquid anacardic material polymerized to the solid state by heating alone and in the absence of Vinsol and then comminuted. These particles, while brittle, are not friable when compared with Vinsol. These particles will not mass to any objectionable degree on storage and are fusible resins which on heating may be converted from the solid to the liquid state before a temperature of 300° F. is attained. This last characteristic is of particular significance and importance, because the solid polymers of said anacardic materials cannot be converted to the liquid state at a temperature even as high as 400° F.

*Preparation of substantially infusible products*

Product VFAn may be converted to the infusible state by reaction with one of said reagents under either alkaline or acidic conditions. For this purpose, 100 parts of Product VFAn in the pulverized form, for example, may be mixed with 1-10 parts of one or a combination of two or more of said reagents under alkaline or acidic conditions, employing as the catalyst any of the well known catalysts known to the art for the purposes of polymerizing cashew nut shell liquid. When hexamethylene tetramine is used as the reagent, then no catalyst need be added, because it acts both as a reactive reagent and also imparts the desired catalytic alkalinity to the mix. The mixture is maintained at a temperature between 250-450° F. to provide a resinous reaction mass which is solid and substantially infusible.

EXAMPLE 1

100 parts of Product VF, produced by reacting 100 parts of Vinsol with 10 parts of furfuraldehyde, are mixed with 25 parts of cashew nut shell liquid and maintained at a temperature between 300-400° F. for about one hour. At the end of that period a sample thereof when cooled to room temperature is a brittle button having a melting point below 300° F. and now to this mass is added 7 parts of formaldehyde and 3 parts of diethyl sulphate. The resultant mass is mixed and then maintained at a temperature of about 350° F. for a period of approximately six hours and at the end of that time will be found to have been converted to the substantially dry and infusible state. If desired, the mass, before the addition of the aldehyde and catalyst, may be poured into shallow pans and allowed to cool to room temperature overnight. The resultant solid resinous product may be pulverized and then mixed with said aldehyde and catalyst and then maintained at 350° F. for six hours for conversion to the infusible state.

EXAMPLE 2

Employing the same procedure as that set forth in Example 1 except that 30 parts of a polymer of cashew nut shell liquid and 5 parts of paraformaldehyde and 5 parts of lime are respectively employed in place of the cashew nut shell liquid, formaldehyde and diethyl sulphate of Example 1 to provide a substantially dry and infusible resinous product. The viscosity of the cashew nut shell liquid polymer employed is 10,000 centipoises at 25° C.

EXAMPLE 3

Employing the same procedure as that set forth in Example 1 except that 50 parts of either one of said distillates of cashew nut shell liquid or a polymer thereof having a viscosity of 5000 centipoises at 25° C. is employed in place of the 25 parts of cashew nut shell liquid and 10 parts of furfuraldehyde and 5 parts of hydrochloric acid are respectively employed in place of the formaldehyde and diethyl sulphate of Example 1 to provide substantially dry and infusible resinous reaction products.

EXAMPLE 4

Employing the same procedure as set forth in Example 1, except that 65 parts of one of said residues of cashew nut shell liquid or a polymer thereof of a very high viscosity and exhibiting cold flow is employed in place of the 25 parts of cashew nut shell liquid and 6 parts of hexamethylene tetramine is employed in place of the formaldehyde and diethyl sulphate of Example 1 to provide a substantially dry and infusible resinous reaction product.

In the production of some of the various products of this invention as shown by the foregoing examples, there is heated together 10 parts by weight of one or a combination of two or more of said liquid anacardic materials and 1-100 parts by weight of either (*a*) Vinsol or (*b*) fusible Vinsol-reagent organic reaction product, and preferably such reaction product which at 300° F. is liquid or combinations of (*a*) and (*b*). The heating is carried out at temperatures of approximately 200-600° F. and in factory practice generally 200-400° F. to provide products, which are liquid at 300° F. and such products may then be reacted with one or more of said reagents to provide resins in the infusible or intermediate thermosetting state.

The novel products of this invention as exemplified by the various products thereof, some of which are illustrated in the foregoing examples, find application in a wide variety of different fields, examples of which are the fields of friction elements such as brake linings, clutch facings and the like; molding powders; laminations; grinding wheels; rubber; and broadly, as a binding agent in a host of various arts. In addition, the various products, namely the Products VFAn as well as the fusible or intermediate thermosetting resins of the present invention may be the raw materials employed in these particular fields. Of course, it is understood by those familiar with the art that in the reaction of Product VFAn with the reagent to provide an infusible end product, the heating of the two may be terminated when the reaction product thereof is still in the intermediate state to provide a thermosetting resin which upon further application of heat may be converted to the infusible state.

In the brake lining field, for example, 5-50 parts of Product VFAn is mixed with 1-10 parts of one or more of said reagents together with a catalyst when required and with 100 parts of asbestos. Usually hexamethylene tetramine is the reagent employed. The asbestos containing mixture may be first cold mixed with or without the aid of a solvent for the resin which solvent, if used, is later driven off. The mass is then heated and shaped at a temperature of 350-500° F. and under pressure, if desired, of 100-3,000 lbs. per square inch for 6-8 hours to provide friction elements of superior quality and in which the novel infusible material therein acts essentially as a binder. In addition, there may be added to the asbestos-Product VFAn-hexamethylene tetramine mix a rubbery material such as natural rubber, reclaimed rubber and polymers of chloroprene and butadiene, rubbery polymers of butadiene, rubbery copolymers of butadiene and styrene and rubbery copolymers of butadiene and acrylonitrile. Also, if desired, the asbestos may be completely eliminated and the aforesaid combinations may be provided by mixing the rubbery material with Product VFAn with or without one of said reagents and a catalyst in the proportions of 5-100 parts of Product VFAn to 100 parts of the rubbery material. The mixture may be milled and thereafter cured by appropriate vulcanizing agents. Of course, when the reagent is employed it is employed in the proportions heretofore set forth. A method which may be employed for the production of a friction element such as a brake lining is to place 90-100 parts of asbestos fibers, 10-50 parts of Product VFAn in pulverized form and 1-5 parts of hexamethylene tetramine into a dough mixer. The dry mass is agitated and mixed to uniformity, then it is molded and shaped under heat of 250-350° F. and a pressure of 1000-3000 lbs. per square inch to produce sheets of required thickness which are later cut to the desired size. The heating is continued under said pressure and temperature conditions for a period of 6-8 hours, whereupon the Product VFAn has been reacted with the hexamethylene tetramine to provide a substantially infusible and dry resinous binder.

If desired, a Product VFAn may be reacted with one or more of said reagents to provide dry, hard and infusible reaction products which may then be comminuted and these particles may be employed as discreet particles, as friction augmenting components in brake linings and clutch facings.

This application is a continuation in part of our copending application Ser. No. 99,858 filed June 17, 1949 and also of our copending application, Ser. No. 133,674 filed December 17, 1949 and later abandoned.

We claim:

1. A novel product produced by heating together (I) a liquid anacardic material selected from the group consisting of cashew nut shell liquid, liquid polymers thereof, distillates of cashew nut shell liquid, said distillate having a boiling point of approximately 225° C. at 10 mm. of mercury pressure, liquid polymers of said distillates, residues of cashew nut shell liquid obtained by heating cashew nut shell liquid until the quantity by weight of said residues is between 25-75% by weight of the cashew nut shell liquid and liquid polymers of said residues and (II) a material selected from the group consisting of (a) pine wood resin having a methoxy content of at least 3%, being at least 70% insoluble in gasoline, at least 90% insoluble in petroleum ether and at least 50% soluble in boiling toluene and (b) a fusible resinous organic reaction product of an agent containing a reactive methylene group and (a).

2. A product as defined in claim 1, with said agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

3. A resinous reaction product of (I) a product defined in claim 1 and (II) an agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

4. A novel product produced by heating together (I) a liquid anacardic material selected from the group consisting of cashew nut shell liquid, liquid polymers thereof, distillates of cashew nut shell liquid, said distillate having a boiling point of approximately 225° C. at 10 mm. of mercury pressure, liquid polymers of said distillates, residues of cashew nut shell liquid obtained by heating cashew nut shell liquid until the quantity by weight of said residues is between 25-75% by weight of the cashew nut shell liquid and liquid polymers of said residues and (II) pine wood resin having a methoxy content of at least 3%, being at least 70% insoluble in gasoline, at least 90% insoluble in petroleum ether and at least 50% soluble in boiling toluene.

5. A novel product produced by heating together (I) a liquid anacardic material selected from the group consisting of a cashew nut shell liquid, liquid polymers thereof, distillates of cashew nut shell liquid, said distillate having a boiling point of approximately 225° C. at 10 mm. of mercury pressure, liquid polymers of said distillates, residues of cashew nut shell liquid obtained by heating cashew nut shell liquid until the quantity by weight of said residues is between 25-75% by weight of the cashew nut shell liquid and liquid polymers of said residues and (II) a fusible resinous organic reaction product of (a) pine wood resin having a methoxy content of at least 3%, being at least 70% insoluble in gasoline, at least 90% insoluble in petroleum ether and at least 50% soluble in boiling toluene and (b) an agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

6. A product produced by heating together (I) liquid residue of cashew nut shell liquid, said residue obtained by heating cashew nut shell liquid until the quantity by weight of said residue is between 25%-75% by weight of the cashew nut shell liquid and (II) a fusible resinous organic reaction product of (a) pine wood resin having a methoxy content of at least 3%, being at least 70% insoluble in gasoline, at least 90% insoluble in petroleum ether and at least 50% soluble in boiling toluene and (b) an agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

7. A product produced by heating together (I) liquid polymeric residue of cashew nut shell liquid, said residue obtained by heating cashew nut shell liquid until the quantity by weight of said residue is between 25%-75% by weight of the cashew nut shell liquid and (II) a fusible resinous organic reaction product of (a) pine wood resin having a methoxy content of at least 3%, being at least 70% insoluble in gasoline, at least 90% insoluble in petroleum ether and at least 50% soluble in boiling toluene and (b) an agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

8. The method comprising heating together at 200-600° F. (I) a liquid anacardic material selected from the group consisting of cashew nut shell liquid, liquid polymers thereof, distillates of cashew nut shell liquid, said distillate having a boiling point of approximately 225° C. at 10 mm. of mercury pressure, liquid polymers of said distillates, residues of cashew nut shell liquid obtained by heating cashew nut shell liquid until the quantity by weight of said residues is between 25-75% by weight of the cashew nut shell liquid and liquid polymers of said residues and (II) a material selected from the group consisting of (a) pine wood resin having a methoxy content of at least 3%, being at least 70% insoluble in gasoline, at least 90% insoluble in petroleum ether and at least 50% soluble in boiling toluene and (b) a fusible resinous organic reaction product of an agent containing a reactive methylene group and (a).

9. The method as defined in claim 8, with said agent selected from the group consisting of formaldehyde, furfuraldehyde, crotonaldehyde, acetaldehyde, glyoxal, acrolein, paraformaldehyde, trioxane, polymerized glyoxal, polymerized acrolein and hexamethylene tetramine.

10. A friction element comprising asbestos and a substantially solid resinous organic reaction product defined in claim 3.

11. A product defined in claim 4, with the ratio by weight of (II) to (I) being 1 part of (II) to .1-1 part of (I).

12. A product defined in claim 5, with the ratio by weight of (II) to (I) being 1-10 parts of (II) to 10-1 parts of (I).

13. A product defined in claim 6, with the ratio by weight of (II) to (I) being 1-10 parts of (II) to 10-1 parts of (I).

14. A product defined in claim 7, with the ratio by weight of (II) to (I) being 1-10 parts of (II) to 10-1 parts of (I).

15. A product produced by heating together (I) liquid residue of cashew nut shell liquid, said residue obtained by heating cashew nut shell liquid until the quantity by weight of said residue is 25%-75% of the weight of the cashew nut shell liquid and (II) a fusible resinous organic reaction product of (a) pine wood resin having a methoxy content of at least 3%, being at least 70% insoluble in gasoline, at least 90% insoluble in petroleum ether and at least 50% soluble in boiling toluene, and (b) furfuraldehyde.

16. A product produced by heating together (I) liquid polymer of residue of cashew nut shell liquid, said residue obtained by heating cashew nut shell liquid until the quantity by weight of said residue is 25%-75% of the weight of the cashew nut shell liquid and (II) a fusible resinous organic reaction product of (a) pine wood resin having a methoxy content of at least 3%, being at least 70% insoluble in gasoline, at least 90% insoluble in petroleum ether and at least 50% soluble in boiling toluene and (b) furfuraldehyde.

17. A product defined in claim 15 in which the ratio by weight of (II) to (I) is 100 parts of (II) to 25-85 parts of (I).

18. A product defined in claim 16 in which the ratio by weight of (II) to (I) is 100 parts of (II) to 25-85 parts of (I).

19. A product produced by heating together (I) cashew nut shell liquid and (II) a fusible resinous organic reaction product of (a) pine wood resin having a methoxy content of at least 3%, being at least 70% insoluble in gasoline, at least 90% insoluble in petroleum ether and at least 50% soluble in boiling toluene, and (b) furfuraldehyde.

20. A product produced by heating together (I) liquid polymer of cashew nut shell liquid and (II) a fusible resinous organic reaction product of (a) pine wood resin having a methoxy content of at least 3%, being at least 70% insoluble in gasoline, at least 90% insoluble in petroleum ether and at least 50% soluble in boiling toluene, and (b) furfuraldehyde.

21. A product defined in claim 19, in which the ratio by weight of (II) to (I) is 100 parts of (II) to 25-85 parts of (I).

22. A product defined in claim 20, in which the ratio by weight of (II) to (I) is 100 parts of (II) to 25-85 parts of (I).

PETER L. ROSAMILIA.
SOLOMON CAPLAN.

No references cited.